No. 648,627.  
W. A. MURRAY.  
RAZOR STROP SUPPORT.  
(Application filed Feb. 8, 1900.)

Patented May 1, 1900.

(No Model.)

Witnesses:
Wilson Ringle.
C. J. Eaton.

Inventor:
William A. Murray
By Ferguson & Lipson
Attorneys.

THE NORRIS PETERS CO., PHOTO-LITHO., WASHINGTON, D. C.

UNITED STATES PATENT OFFICE.

WILLIAM A. MURRAY, OF BALTIMORE, MARYLAND.

RAZOR-STROP SUPPORT.

SPECIFICATION forming part of Letters Patent No. 648,627, dated May 1, 1900.

Application filed February 8, 1900. Serial No. 4,466. (No model.)

*To all whom it may concern:*

Be it known that I, WILLIAM A. MURRAY, a citizen of the United States, residing at Baltimore, in the State of Maryland, have invented certain new and useful Improvements in Razor-Strop Supports, of which the following is a specification.

This invention relates to an improved portable razor-strop support.

One object of the invention is to provide a cheap, simple, and efficient device which can be conveniently carried and readily attached to any convenient object without scratching or otherwise defacing the said object.

A further object of the invention is to provide a device of such a construction that the hook can be folded back in such a manner as to make the device more compact and prevent the said hook from catching in the clothing when being removed from a satchel or other place where it may be packed and to occupy less space when carried in the pocket.

Other features of my invention will be fully set forth in the description of the accompanying drawings, in which—

Figure 1:
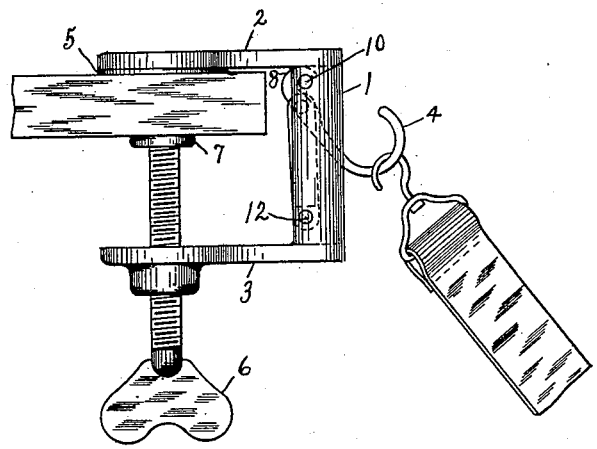
Figure 2:
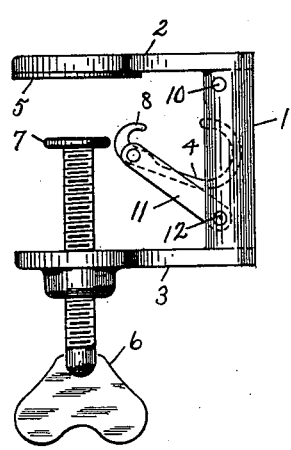
Figure 3:
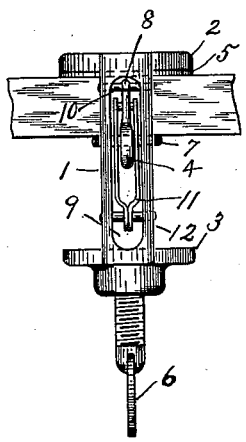

Figure 1 is a side elevation of my improved support having a razor-strop attached to the hook. Fig. 2 shows the hook in the rear position. Fig. 3 is a front elevation with the hook in position to support the strop.

Similar numerals refer to like and corresponding parts throughout the several views.

In the accompanying drawings, 1 designates a vertical bar having laterally-projecting jaws 2 and 3 integral therewith and an elongated opening 9, through which the hook 4 reciprocates.

The jaw 2 is provided on its inner surface with a disk 5, of rubber or other suitable material, which comes in contact with the surface of the object to which the device is attached and prevents the said object from being scratched or otherwise defaced. The said disk 5 may be secured to the jaw by a screw or other suitable means.

The jaw 3 is provided with a thumb-screw 6, by means of which the device is made fast to the object to which the support is to be secured. The upper end of the thumb-screw 6 is provided with a disk 7, of rubber or other suitable material, which disk serves the same purpose as the disk 5. This disk 7 may also be secured to the thumb-screw in any suitable manner.

The hook 4 when in position to support the razor projects laterally from the bar 1 in a direction opposite from that of the jaws 2 and 3. At the rear end of the hook 4 is a small hook 8, which takes over the bar 10 when the hook 4 is in position to support the razor-strop. This hook 4 is pivoted to an arm 11, which in this instance is formed of two pieces of metal. The arm 11 is also pivoted to the bar 12, which extends across the lower end of the elongated slot 9 and is free to move back and forth through said slot. When the device is in use, the hook 4 occupies the position shown in Fig. 1, the small hook 8 being over the bar 10. When the device is to be packed away or carried in the pocket, the hook 4 is raised upward slightly, which releases the hook 8, and arm 11 and hook 4 are pushed back through the slot 9 to the position shown in Fig. 2, the hook 4 passing between the two pieces of metal forming the arm 11.

It will be seen that by having the hook 4 to fold back the device is made more compact and the hook is prevented from catching in the clothing or other article when being removed from the place where packed and is made to occupy less space when carried in the pocket.

Having thus described my invention, what I claim is—

1. In a razor-strop support, the combination of an upright, 1; jaws, 2, and, 3, projecting laterally from said upright; and a hook, 4, movable back and forth through said upright; and means to secure the support to any desired object.

2. In a razor-strop support, the combination of the upright, 1, having an elongated slot, 9, therein; two jaws, 2, and, 3; an arm, 11, pivoted within the lower end of the said slot; a hook, 4, pivoted to the upper end of the said arm; and means to secure the device to any desired object.

3. In a razor-strop support, the combination of the upright, 1, having an elongated slot, 9, therein; a bar, 10, across the upper end of the said slot; an arm, 11, pivoted within the lower end of the slot, 9; a hook, 4, pivoted to the upper end of the said arm; and means to secure the device to any desired object.

In testimony whereof I affix my signature in the presence of two witnesses.

WILLIAM A. MURRAY.

Witnesses:
CHAPIN A. FERGUSON,
ROBERT GIPSON.